Dec. 7, 1954   J. DOLZA   2,696,074
COMBINED TORQUE CONVERTER AND ENGINE AIR-COOLING SYSTEM
Filed Jan. 2, 1953
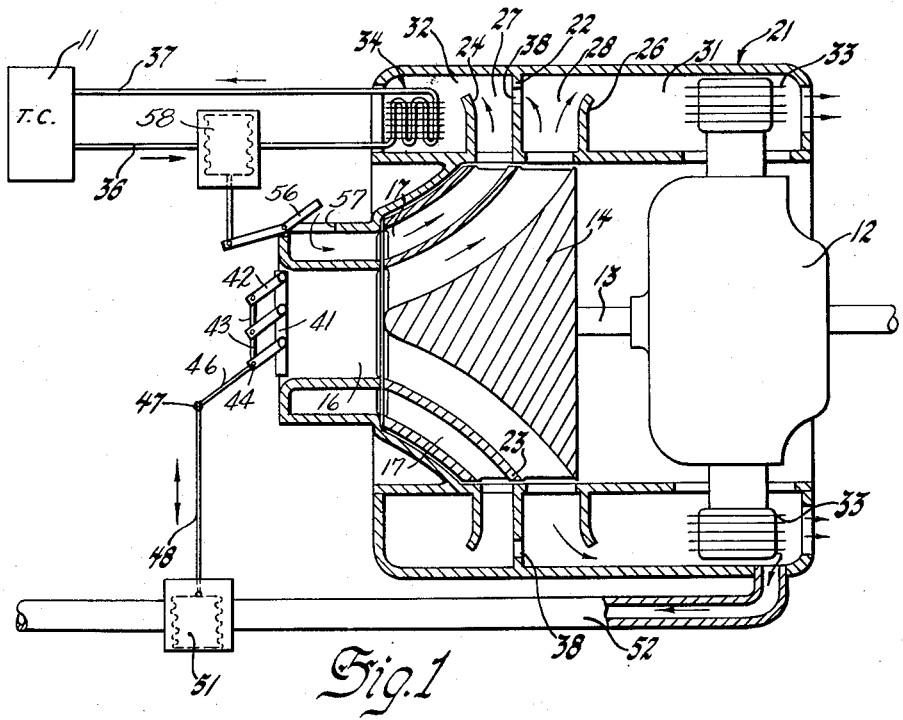
INVENTOR
John Dolza
BY
Willits, Helwig & Baillio
ATTORNEYS

United States Patent Office 2,696,074
Patented Dec. 7, 1954

2,696,074

COMBINED TORQUE CONVERTER AND ENGINE AIR-COOLING SYSTEM

John Dolza, Davisburg, Mich., assignor to General Motors Corporation, Detroit, Mich., a corporation of Delaware Application January 2, 1953, Serial No. 329,422

12 Claims. (Cl. 60—12)

The present invention relates to a combined engine and torque converter cooling system. More particularly, the invention relates to an air cooled system in which both the engine and torque converter are cooled by the use of single centrifugal impeller.

In the past, such systems have generally consisted of a single stage impeller having a fixed maximum capacity sufficient to provide the requisite flow of air to dissipate the heat rejected from both the engine and torque converter under maximum torque output operating conditions. At less than maximum output, such an impeller provides a quantity of air in excess of that required to cool both the converter and the engine with a consequent expenditure of engine horsepower in excess of that required for adequate cooling.

It is the purpose of applicant's invention to provide a combined engine and torque converter cooling system in which the engine horsepower required to drive the cooling mechanism is automatically varied in accordance with the heat being rejected by the engine and torque converter at a given instant.

It is also an object of this invention to provide a combined engine and torque converter cooling system in which the instantaneous heat rejection from both the engine and torque converter controls the quantity of cooling air admitted to a centrifugal impeller.

It is a further object of the invention to provide a combined engine and torque converter cooling system which includes a two-stage air impeller, one stage of which is connected in parallel with the engine and torque converter, and the other stage of which is connected in series with the torque converter.

It is an additional object to provide a combined engine and torque converter cooling system which includes a two-stage impeller, and in which the heat rejection from the engine controls the admission of air into one stage, and the heat rejection from the torque converter controls air admission into the second stage.

Other purposes and objects will be apparent from the detailed description which follows, as well as from the appended claims.

In the drawing:

Figure 1 is a schematic showing of the engine-torque converter cooling system.

Figure 2 is a graphical showing of engine and torque converter cooling requirements under various operating conditions.

Figure 3 is a graphical comparison of the percentage of engine power required for a single stage fan, or impeller, as against a two-stage impeller.

Referring to Figure 1, a torque converter is shown generally at 11, and an engine is shown at 12. Engine 12 includes a power shaft 13. Drivingly connected to shaft 13 is a centrifugal fan, or impeller 14. Impeller 14 is of the well known axial intake-radial output type, and is adapted to be continuously driven at engine speed.

It is well known that engine and torque converter cooling requirements vary greatly depending on the momentary torque load operating conditions of a vehicle. Thus, the power required to operate a relatively fixed capacity cooling system designed to dissipate the heat developed during maximum torque load conditions is excessive during normal torque load operating conditions. Inasmuch as maximum torque operation constitutes a relatively small percentage of the total operating time of such an engine and torque converter it is apparent that such a fixed capacity system is unnecessarily consumptive of engine power.

In order to reduce the horsepower required to operate impeller 14, it is made in two stages 16 and 17, the flow of air into which is automatically controlled. In effect, such a construction may consist of two single stage impellers, one being concentrically mounted piggy-back upon the other. The air flow capacity of stage 16 is made such that it alone can supply sufficient air to cool both the engine 12 and torque converter 11 when operating under normal torque load conditions. In such a case, it is possible to shut off the second stage 17 with a consequent saving in horsepower. When, however, the vehicle is operating under heavy, or maximum, torque load requirements, stage 17 may be utilized to supplement the cooling process. The power saving with such a two-stage impeller is illustrated in Figure 3. Curve $P_1$ represents the percentage of engine horsepower consumed with a single stage impeller of sufficient capacity to meet all cooling requirements. Curve $P_2$ represents power consumption with applicant's two-stage impeller. The power consumption drop at M indicates the point at which second stage 17 of the impeller is shut off.

Circumferentially surrounding impeller 14 is an annular diffuser indicated generally at 21. Diffuser 21 is divided by a wall 22, which is in effect a continuation of the wall 23 dividing impeller stages 16 and 17. The diffuser also includes plates 24 and 26, which in combination with wall 22 define a pair of diffuser inlet nozzles 27 and 28. Stage 16 of the impeller supplies cooling air to a diffuser chamber 31, while stage 17 supplies a diffuser chamber 32. Chamber 31 constitutes the engine cooling portion of the diffuser, while chamber 32 constitutes the torque converter cooling portion of the diffuser. As will be seen, heat rejecting surfaces 33 of engine 12 project within diffuser chamber 31 and are adapted to be cooled by the air flow therethrough. Similarly, a conventional type of liquid heat exchanger 34 is located in chamber 32. The heated torque converter oil flows from passage 36 into heat exchanger 34. The cooled oil flows back into the converter through a passage 37. Diffuser wall 22 has an opening 38 therein. The purpose of opening 38 is to bypass a certain amount of the air from stage 16 of the impeller for cooling the torque converter fluid when the vehicle is operating under normal torque load conditions and the second stage 17 source of air is shut off.

In order to control the amount of air entering inlet 41 of the first impeller stage 16, a plurality of adjustable louvers, or valves 42, are provided therein. The valves are connected by links 43 so as to be movable in unison. A control for the louvers 42 includes any convenient combination of linkages. In this case end 44 of a lever 46 is pivotally secured to one of the louvers 42, while the other end 47 of the lever is pivotally secured to an operating arm 48. Thus as arm 48 is moved upwardly or downwardly louvers 42 will open or close. The amount of opening permitted by the louvers is automatically controlled by the amount of heat being rejected by the engine, that is to say, the hotter the engine operation becomes, the greater will be the louver openings. Such automatic control is accomplished by providing a heat responsive device 51. Heat responsive device 51, which may be any well known type of thermostatic motor, is subjected to air which has been heated by passing over the engine heat rejection surfaces. Device 51 is disposed so as to be exposed to the heated air which has passed over engine heat rejection surfaces 33. This may be accomplished by placing the device directly with the diffuser casing or by bleeding off a portion of the heated air through a passage 52 and directing it against a more conveniently located heat responsive element as shown in Figure 1. Thermostatic motor 51 is connected to operating arm 48 and moves the latter in accordance with variations in operating temperatures and thus cooling requirements.

During the normal operation of the engine, louvers 42 will continuously vary the size of the inlet opening 41.

A similar valve 56 is provided at the inlet opening 57 of the second impeller stage 17. Valve 56 is likewise controlled by a thermostatic element 58 interposed in the torque converter circulating line 36. Thermostatic element 58 is so adjusted that the temperature of the torque converter fluid during normal operation will maintain valve 56 in a position closing second stage inlet 57, in which case the second stage of the impeller will not be supplying coolant to the system. During high torque operation, the increased temperature of the oil passing through the thermostatic element will, through the aforementioned linkage mechanism open valve 56, as shown in Figure 1, thus admitting air into the second stage of the impeller. Thus, during high torque, which corresponds to high heat, operation, air is predominantly being supplied to the torque converter heat exchanger by the second stage 17.

In Figure 2, the B. t. u. cooling requirements during various phases of engine and torque converter operation are illustrated. The cooling requirements of a torque converter vary between line $C_M$ indicating maximum heat rejection at maximum torque output and line $C_R$ which indicates normal heat rejection at normal torque load. The cooling requirement of the engine is represented by curve E. The total cooling requirement is represented by curve T.

While a specific embodiment of applicant's invention has been disclosed for descriptive purposes it is apparent that minor structural modifications may be made within the scope of the applicant's inventive concept.

I claim:

1. An engine and torque converter cooling system including in combination engine and torque converter heat rejection surfaces, a two-stage air impeller and an air diffuser in air communication with said impeller and having plural intercommunicating chambers, said engine heat rejection surfaces being contained in one of said chambers, said torque converter heat rejection surfaces being contained in another of said chambers, said diffuser distributing the air from said impeller to said heat rejection surfaces.

2. An engine and torque converter cooling system including in combination an air impeller having an inlet passage and an outlet passage, an air diffuser in air communication with said outlet passage, said diffuser having plural intercommunicating chambers, engine heat rejection surfaces in one of said chambers, torque converter heat rejection surfaces in another of said chambers, said diffuser distributing cooling air respectively to said engine and said torque converter heat rejection surfaces, and means associated with said inlet passage to control the quantity of air admitted to said impeller.

3. A combined engine and torque converter cooling system which includes a centrifugal air impeller having an inlet passage and an outlet passage, an air diffuser in air communication with said outlet passage and having plural intercommunicating chambers, an engine having heat rejection surfaces contained in one of said chambers, a torque converter having heat rejection surfaces contained in another of said chambers, said diffuser distributing cooling air respectively to the heat rejection surfaces of said engine and said torque converter, a flow control device associated with the inlet passage to regulate the quantity of air admitted to said impeller, and means operated by the heat from said engine for controlling said device.

4. A combined engine and torque converter cooling system which includes a two-stage air impeller, each stage including an air inlet and an air outlet, an air diffuser in air communication with said air outlet, said diffuser having plural intercommunicating chambers, an engine having heat rejection surfaces contained in one of said chambers, a torque converter having heat rejection surfaces contained in another of said chambers, said diffuser distributing cooling air to the heat rejection surfaces of said engine and said torque converter, and individual flow control devices associated with each inlet passage to control the air admitted to each stage.

5. A combined engine and torque converter cooling system which includes a two-stage air impeller, each stage including an air inlet and an air outlet, an air diffuser in air communication with said air outlets, said diffuser having plural intercommunicating chambers, an engine having heat rejection surfaces contained in one of said chambers, a torque converter having heat rejection surfaces contained in another of said chambers, said diffuser distributing cooling air to the heat rejection surfaces of said engine and said torque converter, individual flow control devices associated with each inlet passage to control the air admitted to each stage, means responsive to heat from said engine for controlling one of said devices, and means responsive to heat from said torque converter for controlling the other of said devices.

6. A combined engine and torque converter cooling system which includes a two-stage air impeller, each stage including an air inlet and an air outlet, an air diffuser in air communication with said air outlets, said diffuser having plural intercommunicating chambers, an engine having heat rejection surfaces contained in one of said chambers, a torque converter having heat rejection surfaces contained in another of said chambers, said diffuser distributing cooling air to the heat rejection surfaces of said engine and said torque converter, a flow control device associated with the inlet passage to one of said impeller stages, a flow control device associated with the inlet passage to the other stage of said impeller, said flow control devices controlling the air admitted to the respective stages, means responsive to heat from said engine heat rejection surfaces for controlling one stage flow control device, and means responsive to heat from said torque converter heat rejection surfaces for controlling the other stage flow control device.

7. A combined engine and torque converter cooling system which includes a two-stage air impeller, each stage including an air inlet and an air outlet, an air diffuser in air communication with said air outlets, engine heat rejection surfaces in one of said chambers, torque converter heat rejection surfaces in another of said chambers, said diffuser directing the flow from one stage primarily to the engine heat rejection surfaces and directing the flow from the other stage primarily to the torque converter heat rejection surfaces, and separate flow control devices for each inlet passage to control the air admitted to each stage.

8. A combined engine and torque converter cooling system which includes in combination a two-stage air impeller, each stage including an air inlet and an air outlet, an air diffuser in air communication with said air outlets, said diffuser having plural intercommunicating chambers, engine heat rejection surfaces contained in one of said chambers, torque converter heat rejection surfaces contained in another of said chambers, said diffuser distributing cooling air to said engine and torque converter heat rejection surfaces, the first stage of said impeller having sufficient air flow capacity to provide adequate coolant to said engine and torque converter heat rejection surfaces during normal torque load operation, and control means for causing said second impeller stage to supplement the air output of said first stage during maximum torque load operating conditions.

9. A combined engine and torque converter cooling system which includes in combination a two-stage air impeller, each stage including an air inlet and an air outlet, an air diffuser in air communication with said air outlets, said diffuser having plural intercommunicating chambers, engine heat rejection surfaces contained in one of said chambers, torque converter heat rejection surfaces contained in another of said chambers, said diffuser distributing cooling air to the engine and torque converter heat rejection surfaces, the first stage of said impeller having sufficient air flow capacity to provide adequate coolant to said engine and torque converter heat rejection surfaces during normal torque load operation, and control means for causing said second impeller stage to supplement the air flow to said torque converter heat rejection surfaces during maximum torque load operating conditions.

10. A combined engine and torque converter cooling system which includes in combination a two-stage air impeller, each stage including an air inlet and an air outlet, an air diffuser in air communication with said air outlets, engine heat rejection surfaces and torque converter heat rejection surfaces in said diffuser, said diffuser distributing cooling air to said engine and torque converter heat rejection surfaces, the first stage of said impeller having sufficient air flow capacity to provide adequate coolant to said heat rejection surfaces during normal torque load operation, a flow control device for the air inlet of the first stage of said impeller, a flow control device for the air inlet of the second stage of said impeller, means responsive to heat from said engine heat rejection surfaces for controlling one of said devices, and means responsive to heat from said torque converter heat rejection surfaces for controlling the other of said devices, the flow control device of said second impeller stage causing said second impeller stage to supplement the air output of the first stage during maximum torque load operating conditions.

11. A combined engine and torque converter cooling system which includes in combination a two-stage air impeller, each stage including an air inlet and an air outlet, an air diffuser in air communication with said air outlets, engine heat rejection surfaces and torque converter heat rejection surfaces in said diffuser, said diffuser distributing cooling air to said engine and torque converter heat rejection surfaces, the first stage of said impeller having sufficient air flow capacity to provide adequate coolant to said heat rejection surfaces during normal torque load operation, a flow control device associated with the air inlet of said first impeller stage, a first thermostatic element responsive to heat from said engine heat rejection surfaces for controlling the first stage flow control device, a second flow control device associated with the air inlet of the second stage of said impeller, and a second thermostatic element responsive to heat from said torque converter heat rejection surfaces for controlling the second stage flow control device, the flow control for said second impeller stage causing said second impeller stage to supplement the air output of said first stage during maximum torque load operating conditions.

12. A combined engine and torque converter cooling system which includes in combination a two-stage air impeller, each stage including an air inlet and an air outlet, an air diffuser in air communication with said air outlets, engine heat rejection surfaces and torque converter heat rejection surfaces in said diffuser, said diffuser distributing cooling air to said engine and torque converter heat rejection surfaces, the first stage of said impeller having sufficient air flow capacity to provide adequate coolant to said heat rejection surfaces during normal torque load operation, a first flow control device associated with the air inlet of the first stage of said impeller, a second flow control device associated with the air inlet for the second stage of said impeller, a first thermostatic element responsive to heat from said engine heat rejection surfaces for controlling said first stage flow control device, and a second thermostatic element responsive to heat from said torque converter heat rejection surfaces for controlling said second stage flow control device, said second thermostatic element being operative to close said second stage flow control device during normal torque load operating conditions and being operative to open said second stage flow control device during maximum torque load operating conditions thereby to cause said second impeller stage to supplement the air output of said first stage.

References Cited in the file of this patent

UNITED STATES PATENTS

| Number | Name | Date |
|---|---|---|
| 2,343,304 | La Brie | Mar. 7, 1944 |
| 2,369,835 | McGill | Feb. 20, 1945 |
| 2,379,015 | Lysholm | June 26, 1945 |